Oct. 6, 1959  H. J. BUTLER  2,907,412
DISC BRAKES

Filed Dec. 5, 1955  4 Sheets-Sheet 1

INVENTOR
Henry James Butler
by Benj. T. Rauber
his attorney

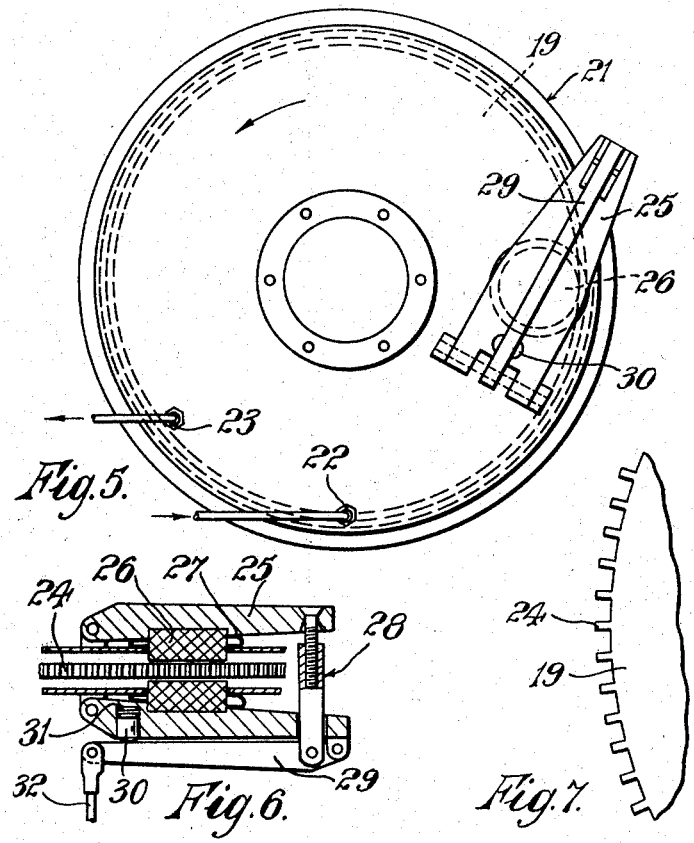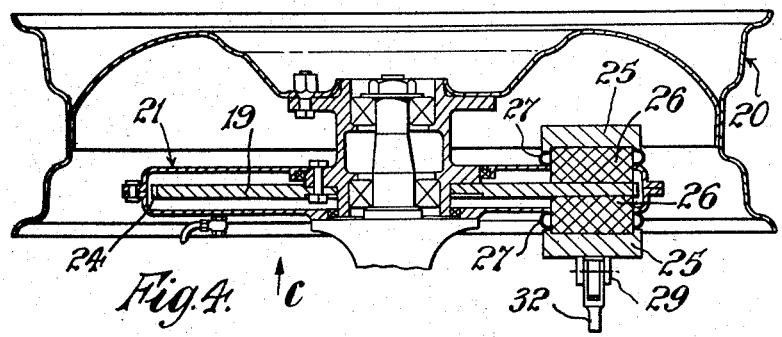

Oct. 6, 1959  H. J. BUTLER  2,907,412
DISC BRAKES

Filed Dec. 5, 1955  4 Sheets-Sheet 3

INVENTOR
Henry James Butler
by Benj. T. Rauber
his attorney

United States Patent Office 2,907,412
Patented Oct. 6, 1959

2,907,412

DISC BRAKES

Henry James Butler, Sutton Coldfield, England, assignor to Dunlop Rubber Company Limited, London, England, a British company Application December 5, 1955, Serial No. 551,146

Claims priority, application Great Britain December 11, 1954

1 Claim. (Cl. 188—73)

This invention relates to disc brakes and more particularly relates to liquid cooled disc brakes.

Considerable heat is generated on braking a heavy and fast motor vehicle and liquid cooled disc brakes have been proposed wherein the disc and adjacent parts of the brake are immersed in a cooling liquid. The object of the present invention is to provide an improved disc brake assembly of this type.

According to the present invention a disc brake assembly comprises an annular rotatable disc, a non-rotatable casing liquid-tightly surrounding said disc, non-rotatable angularly-movable pressure members axially-aligned on opposite sides of said disc, pads of friction material secured to said pressure members and movable to frictionally engage said disc and a mechanism for angularly moving said pressure members to effect said frictional engagement.

Preferably the pressure members are exterior of the casing and the friction pads are movable through apertures in the casing and the mechanism for effecting frictional engagement comprises means extending axially adjacent a periphery of the disc and having one end associated with one of the pressure plates and the other end passing through a hole in the other pressure plate and having secured thereto a fluid pressure operated mechanism or a lever angularly movable by a fluid pressure operated mechanism. The friction pads are not necessarily a sliding fit in the apertures in the casing and consequently means are provided for preventing leakage of liquid between the edges of the apertures and the friction pads. Said means may comprise rubber grommets. Preferably also means are provided for circulating cooling liquid through the casing, and this may comprise vanes or paddles formed on the outer periphery of the disc.

In order that the invention may be more fully described, reference is made to the accompanying drawings, of which:

Figure 4 is a sectional view of a wheel and of a brake assembly constructed in accordance with another embodiment of the invention.

Figure 5 is a view of the brake of Figure 4 looking in the direction of arrow C.

Figure 6 is a section through the brake applying mechanism of the brake shown in Figures 4 and 5.

Figure 7 is a fragmentary view of the edge of the disc shown in Figures 4, 5 and 6.

Figure 3:
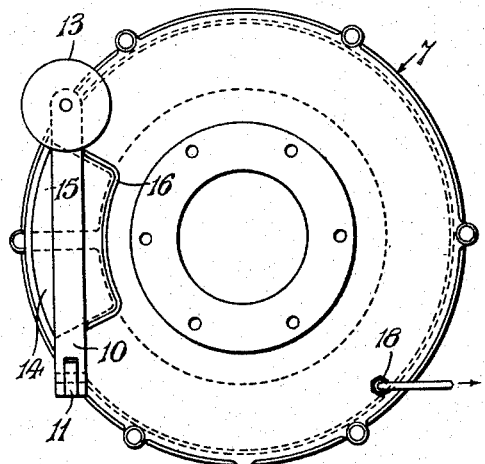
Figure 3 is a view of the brake assembly of Figure 1 looking in the direction of arrow B.
Figure 1:
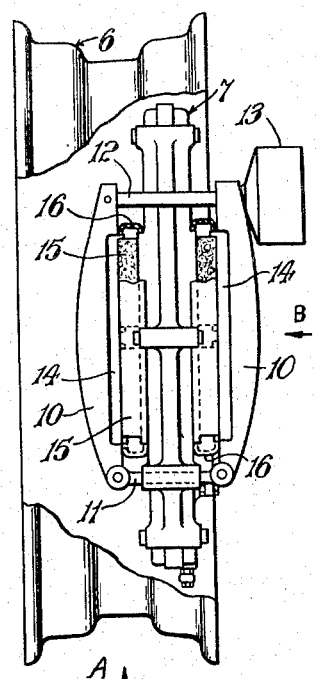
Figure 1 is a partly cut-away view of a wheel and of a brake assembly constructed in accordance with one embodiment of the invention.
Figure 2:
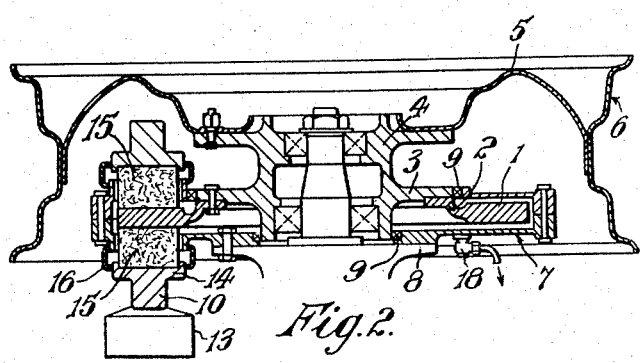
Figure 2 is a sectional view of the wheel and brake assembly of Figure 1 looking in the direction of arrow A.

Figures 1 to 3 illustrate one embodiment of the invention in which the brake assembly is associated with a vehicle wheel. The brake comprises an annular disc 1 provided at its inner periphery with a cylindrical portion 2 the end of which is fluid-tightly secured to an annular flange 3 integral with the wheel hub 4 and the inner periphery of a web 5 of a wheel 6 is also secured to said flange. A casing 7 is provided to enclose the disc, said casing being in two parts liquid-tightly secured to each other at the outer periphery by nuts and bolts. The inner periphery of one part of the casing is secured to a non-rotatable flange 8 of the wheel assembly, and the inner periphery of both parts of the casing are provided with seals 9 to liquid-tightly co-operate with flanges 3 and 8 respectively.

The two parts of the casing are each provided with a segmental shaped aperture, one axially-aligned on each side of the disc. A beam 10 extends chordwise across each aperture, said beams being axially-aligned one on each side of the casing, and the ends of the beams project beyond the outer periphery of the casing. A link 11 connects one pair of axially-aligned ends of the beam, said link slidably fitting in a passage in the outer periphery of the casing. An operating rod 12 is secured to one of the other pair of beam ends and passes axially adjacent the casing, through an aperture through the other of the beam ends and is secured to a piston (not illustrated) working in a cylinder 13 the base thereof abutting the adjacent beam end. An annular space between the piston and the base of the cylinder is connected to a source of fluid pressure so that an increase in pressure in said space angularly moves the beams towards one another.

A segmental pressure plate 14 is formed integrally with each of the beams to be aligned with the segmental shaped apertures in the casing, and secured to each of the pressure plates are two segmental shaped pads 15 of friction material to extend through the apertures and frictionally engage the radially-extending sides of the disc. A flexible rubber grommet 16 is provided between the pressure plates and the edges of the aperture in the casing to prevent leakage of liquid from the casing.

The casing is partially filled with a cooling liquid which is provided with a rust inhibitor and an agent to prevent freezing. An inlet connection 17 is provided at the base of the casing and an outlet connection 18 is provided at a distance vertically above the inlet connection to give a depth of liquid sufficient to cover the braking surfaces of the disc during one revolution thereof. A pump is provided to continuously circulate a cooling liquid through the casing and through a cooling system.

The brake is operated by actuating the piston and cylinder mechanism, as by a master-cylinder or the like, to draw the beams and pressure plates towards the disc and thus force the friction pads into frictional engagement with the disc. The heat generated on braking is transmitted to the liquid through which the disc rotates and the liquid thus heated is continuously circulated through the casing and cooling system. The brake is thus unable to heat up to a degree at which brake fade sets in. The disc is also protected from road dirt and the like.

Another brake suitable for a vehicle is illustrated in Figures 4, 5, 6 and 7. This comprises a disc 19 secured to and rotatable with a wheel 20, as in the previous embodiment of the invention, and a casing 21 liquid-tightly encloses the disc. The casing is provided with inlet and outlet connections 22 and 23 respectively for connection to a liquid cooling system and the disc is provided at its outer periphery with vanes 24 to pump the liquid through the casing and system.

Two pressure plates 25 are provided, axially-aligned one on each side of the disc, and each plate has one end pivotally secured to a radially-extending side of the casing, along a line extending substantially radially across the casing, and the other end projecting beyond the outer periphery of the casing. Each pressure plate has secured thereto a cylindrical pad 26 of friction material which extends through an aperture in the casing and is adapted to frictionally engage the adjacent side of the disc. Rubber grommets 27 prevent leakage of liquid from the casing.

An operating rod 28, comprising two members screwed together to enable adjustments to be made to compensate for wear of the pads, has one end associated with one of the pressure plates and the other end passing through an aperture in the other of said plates. Said end is pivotally secured to a lever 29, intermediate the ends thereof, said lever lying alongside the adjacent pressure plate 25 and having an end pivotally secured to said pressure plate and the other end abutting a piston 30 adapted to work in a cylinder 31 formed in said pressure plate. The cylinder is adapted to be connected to a source of fluid pressure. The end of the lever remote from the operating rod is adapted to be connected by a cable 32 or the like to a brake lever.

Operation of the piston and cylinder mechanism moves the lever angularly to force one pressure plate towards the disc and to simultaneously draw the other pressure plate towards the disc, thus effecting frictional engagement between the disc and pads. The brake may also be operated mechanically, as by a handbrake, by tensioning the cable to angularly move the lever and thus obtain the same effect. The normal direction of rotation of the disc, as viewed in Figure 5, is counter-clockwise, to avoid any undesirable servo effects.

Figure 9:
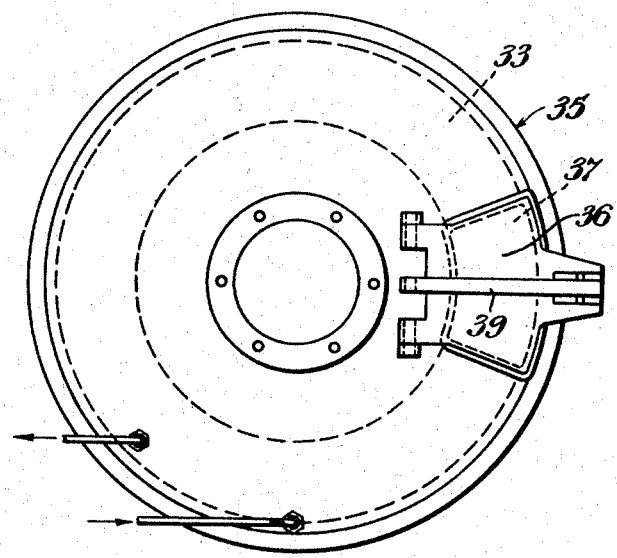
Figure 9 is a view of the brake of Figure 8 looking in the direction of arrow D.
Figure 8:
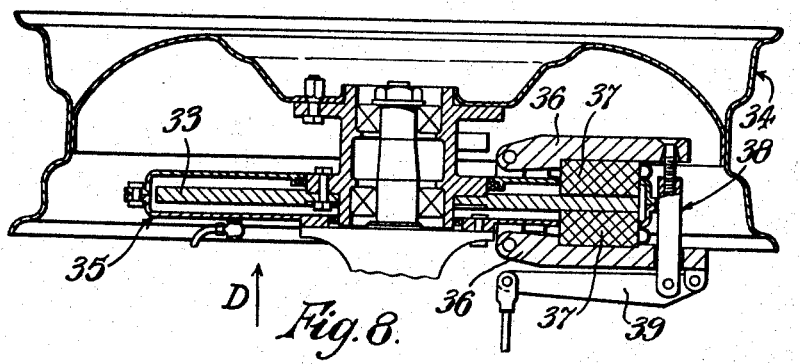
Figure 8 is a sectional view of a wheel and of a brake assembly constructed in accordance with another embodiment of the invention.

A similar type of brake is illustrated in Figures 8 and 9. This comprises a disc 33 rotatable with a wheel 34 and enclosed liquid-tightly in a non-rotatable casing 35. Axially-aligned pressure plates 36 have segmental pads 37 of friction material secured thereto to extend liquid-tightly through apertures in the casing and to frictionally engage the disc. The means to actuate the brake comprises an operating rod 38 and lever mechanism 39, substantially as described in the previous embodiment of the invention. The piston and cylinder mechanism is not shown but may be fitted if desired.

Figure 10:
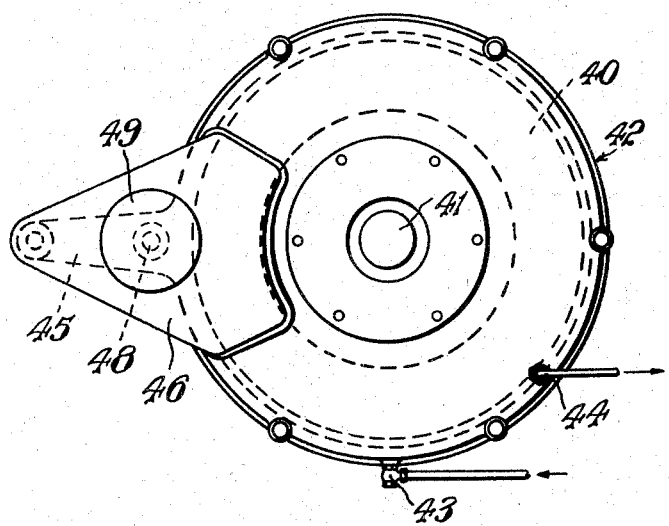
Figure 10 illustrates a disc brake assembly constructed in accordance with a further embodiment of the invention.
Figure 11:
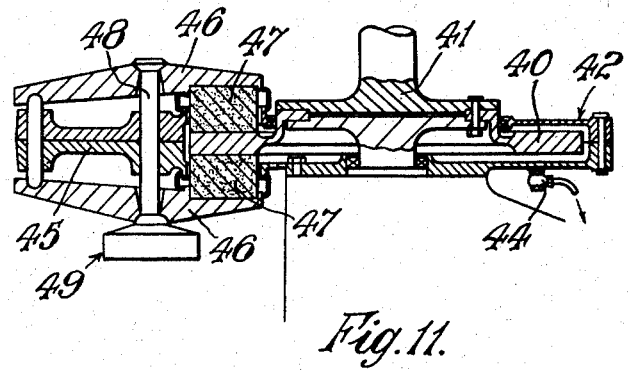
Figure 11 is a horizontal section through the brake illustrated in Figure 10.

A further embodiment of the invention is illustrated in Figures 10 and 11. This shows a transmission brake and comprises a disc 40 secured to and rotatable with a shaft 41 and a non-rotatable casing 42 liquid-tightly surrounding the disc. The casing is provided with inlet and outlet connections, 43 and 44 to enable a supply of cooling liquid to be circulated therethrough.

The casing is provided integrally with a radially-extending member 45 having pivotal connections at its outer end for the adjacent end of two pressure plates 46 which are axially aligned one on each side of the casing. The other ends of said pressure plates have secured thereto segmental pads 47 of friction material which extend liquid-tightly through apertures in the casing and are adapted to frictionally engage the disc. An operating rod 48 is slidably fitted in a passage extending-axially through said member 45 adjacent the outer periphery of the disc and one end of said operating rod is associated with one of the pressure plates and the other end passes through an aperture in the other pressure plate and is secured to a piston (not illustrated) working in a cylinder 49, the base thereof abutting the adjacent pressure plate. An annular space between the piston and the base of the cylinder is adapted to be connected to a source of fluid pressure so that an increase in pressure in said annular space moves both pressure plates inwardly towards the disc to force the pads of friction material into frictional engagement with the disc.

Having now described my invention what I claim is:

A disc brake assembly comprising an annular rotatable disc, non-rotatable torque plates surrounding said disc and constituting a liquid-tight enclosure therefor, non-rotatable radially-extending pressure members axially-aligned one on each side of the disc and pivotally secured to said torque plates, pads of friction material secured to said pressure members and movable in apertures in said torque plates to frictionally engage opposite sides of said disc, a flexible annular diaphragm secured at its inner periphery to said pressure member and at its outer periphery to the edge of an associated aperture to prevent leakage of liquid from said enclosure and a mechanism for angularly moving said pressure members to effect said frictional engagement.

References Cited in the file of this patent

UNITED STATES PATENTS

| | | |
|---|---|---|
| 2,303,710 | Sinclair | Dec. 1, 1942 |
| 2,399,010 | Eksergian et al. | Apr. 23, 1946 |
| 2,663,384 | Chamberlain | Dec. 22, 1953 |
| 2,682,320 | Chamberlain et al. | June 29, 1954 |
| 2,689,024 | Trevaskis | Sept. 14, 1954 |
| 2,711,802 | Davis | June 28, 1955 |
| 2,728,420 | Wright et al. | Dec. 27, 1955 |
| 2,756,844 | Chamberlain et al. | July 31, 1956 |
| 2,790,516 | Wright et al. | Apr. 30, 1957 |

FOREIGN PATENTS

| | | |
|---|---|---|
| 1,018,800 | France | Jan. 13, 1953 |
| 709,305 | Great Britain | May 19, 1954 |
| 711,059 | Great Britain | June 23, 1954 |